Nov. 3, 1953         C. O. JONKERS                    2,657,553
    SELF-DRIVING DEVICE FOR TRANSPORTING HEAT FROM
         A LOWER TO A HIGHER TEMPERATURE LEVEL
Filed Oct. 3, 1951                              6 Sheets-Sheet 1
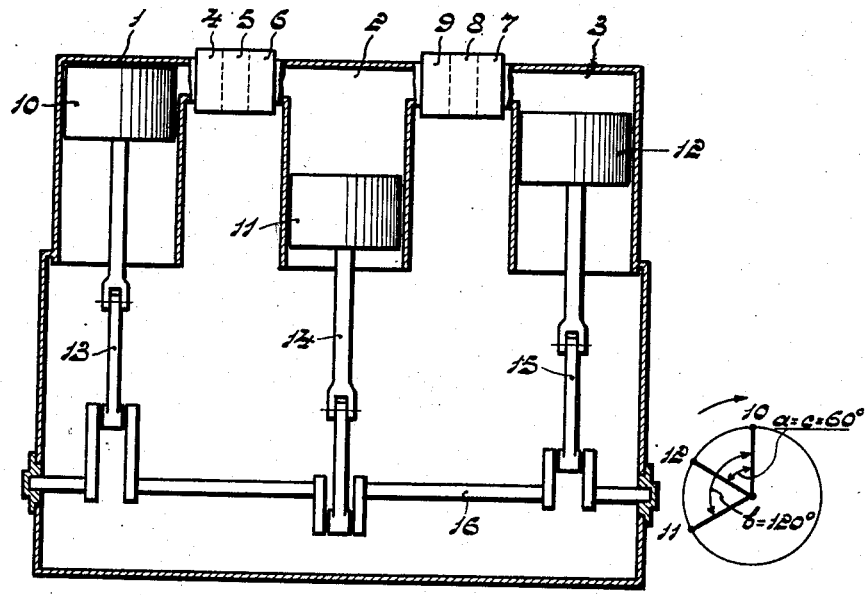
Fig.1      Fig.1ᵃ
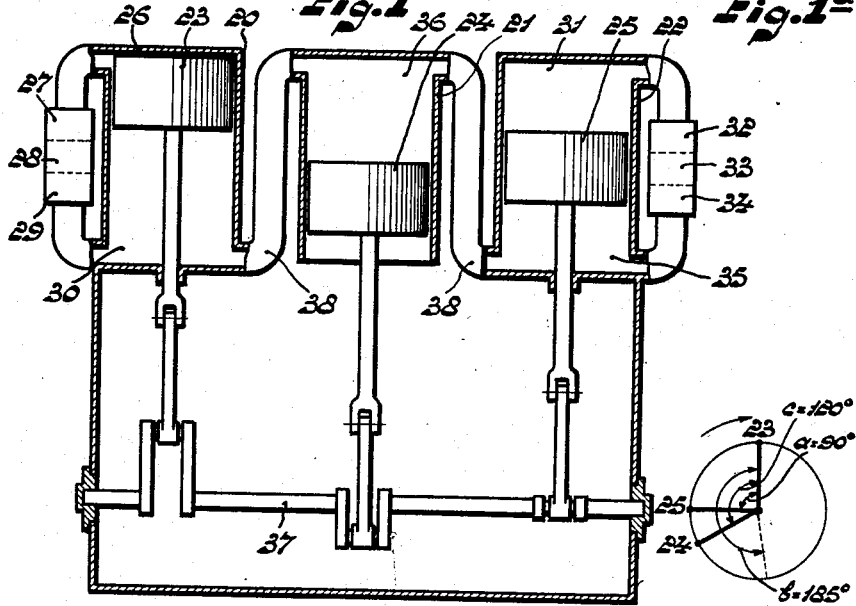
Fig.2      Fig.2ᵃ
INVENTOR
Cornelius Otto Jonkers
By 
                      Agent Nov. 3, 1953

C. O. JONKERS 2,657,553

SELF-DRIVING DEVICE FOR TRANSPORTING HEAT FROM
A LOWER TO A HIGHER TEMPERATURE LEVEL

Filed Oct. 3, 1951

INVENTOR
Cornelius Otto Jonkers
By
Agent

Fig. 5ᵃ

INVENTOR
Cornelius Otto Jonkers
By

Nov. 3, 1953     C. O. JONKERS     2,657,553
SELF-DRIVING DEVICE FOR TRANSPORTING HEAT FROM
A LOWER TO A HIGHER TEMPERATURE LEVEL
Filed Oct. 3, 1951     6 Sheets-Sheet 5

INVENTOR
Cornelius Otto Jonkers
By
Agent

Nov. 3, 1953 C. O. JONKERS 2,657,553
SELF-DRIVING DEVICE FOR TRANSPORTING HEAT FROM
A LOWER TO A HIGHER TEMPERATURE LEVEL
Filed Oct. 3, 1951 6 Sheets-Sheet 6

INVENTOR
Cornelius Otto Jonkers
By
Agent

Patented Nov. 3, 1953

2,657,553

UNITED STATES PATENT OFFICE 2,657,553

SELF-DRIVING DEVICE FOR TRANSPORTING HEAT FROM A LOWER TO A HIGHER TEMPERATURE LEVEL

Cornelius Otto Jonkers, Eindhoven, Netherlands, assignor to Hartford National Bank and Trust Company, Hartford, Conn., as trustee Application October 3, 1951, Serial No. 249,591
Claims priority, application Netherlands October 9, 1950

10 Claims. (Cl. 62—136)

As a rule, the conventional devices for transporting heat from a lower temperature level to a higher, for example a refrigerating device, an air-conditioning installation, or a heat pump, are constituted by a refrigerating machine and an electric motor driving the refrigerating machine. The electric motor supplies the mechanical energy required for the refrigerating machine.

The object of the invention is to provide a self-driving device.

According to the invention, the self-driving device for transporting heat from a lower temperature level to a higher, constructed as a closed system, which device contains an amount of gas of invariable chemical composition as the working medium, and comprises a hot space and a freezing space, each of which communicates by way of a heater, a regenerator and a cooler with a cooled space. The volumes of said spaces, together with the total volume of the working space, are varied by interconnected piston-like bodies reciprocating substantially harmonically with a constant difference in phase. The variations in volume of the hot space differ in amount $b$ from those of the cooled space and by an amount $c$ from those of the total space, $a$, $b$, and $c$ being assumed as positive if the hot space leads with respect to the spaces concerned, while both $a$ and $c$ are comprised between $d-180°$ and $d$, and $$\tan d = \frac{vt_v \sin a + k \sin b}{vt_v \cos a + k \cos b + t_w}$$

in which both sin $d$ and the numerator of the fraction are positive. In this fraction $v$ = the ratio between the amplitude of the volume variations of the freezing space and the amplitude of the volume variations of the hot-space.

$k$ = the ratio between the amplitude of the volume variations of the cooled space and the amplitude of the volume variations of the hot space.

$t_v$ = the ratio between the average absolute temperature of the medium in the cooled space and the average absolute temperature of the medium in the freezing space.

$t_w$ = the ratio between the average absolute temperature of the medium in the cooled space and the average absolute temperature of the medium in the hot space.

Applicant has found that in the device according to the invention, a portion of the energy supplied to the hot space may be used to drive the refrigerating device. In this case, the device must satisfy the requirements indicated above. In the construction according to the invention, an amount of energy is carried off with the use of a piston-like body and supplied as mechanical energy to a common crank-shaft. This amount of energy must naturally be at least such that the piston-like bodies are reciprocated. The amount of energy given off by the piston-like body to the crank-shaft may, however, also be greater than is strictly necessary to reciprocate the piston-like bodies in the machine. In this case, the excess energy may be used for other purposes, for example for driving fuel pumps and the like.

In one advantageous embodiment of the invention, the volumes of two spaces of sequential temperature levels are acted upon by the end surfaces of a common piston-like body.

In a further embodiment of the invention, both the volume of the hot space and the volume of the cooled space are acted upon by the end surfaces of a common piston-like body, while furthermore, the volumes of the freezing space and of the cooled space are also acted upon by the end surfaces of another common piston-like body, provision being made of a third piston-like body of which only one surface acts upon the variations in volume of one of the spaces.

This embodiment may be made of a simple construction if the third piston-like body moves in phase with the piston-like body acting upon both the cooled space and the freezing space.

In a further embodiment, the device comprises only two piston-like bodies, the piston-like body acting upon both the volume of the freezing space and the volume of the cooled space being in the form of a differential piston.

When reference is made to a heater, this is to be understood to mean a heat-exchanger by which thermal energy is supplied to the working medium in the device. Owing to the supply of thermal energy to the heater which communicates with the hot-space, the latter space is maintained at a high temperature. In the vicinity of the freezing space is a further heat-exchanger by which thermal energy (at a comparatively low temperature) is supplied to the working medium in the device. This heater is generally referred to as the "freezer."

The term "cooler" is to be understood to mean a heat-exchanger by which thermal energy is abstracted from the working medium.

The device according to the invention is of the self-driving type, that is to say that, in contradistinction with the devices hitherto known, supply of mechanical energy is not required. The energy required for driving the device is supplied as thermal energy with the use of a burner to the heater associated with the hot-space. This affords several advantages. Thus, the efficiency of the device may be comparatively high, since the energy supplied to the device need not first be converted into mechanical energy, which always involves losses.

The piston-like bodies of the device are reciprocated substantially harmonically so as to ensure easy driving of the piston-like bodies.

In a further embodiment of the invention, the second piston-like body in the last-mentioned construction may also be constructed as a differential piston.

In a further embodiment of the invention, it is furthermore possible that both the volume of the hot space and the volume of the cooled space are acted upon by the end surfaces of a common piston-like body, while only one further piston-like body and only one operating surface are provided, the latter body acting upon the volume variations of the freezing space. This embodiment thus comprises only one "piston" and one "displacer."

In an advantageous embodiment of the invention, the device may be so constructed that the center lines of the two piston-like bodies make an angle of the order of 90°, the spaces adjacent the crank-shaft jointly constituting the cooled space. This construction permits the use of a simple device capable of being satisfactorily balanced and in which the clearance spaces are minimized.

According to the invention, the crank-case of the device may be made as a closed system and has no lead-through devices for the shaft. The conventional refrigerating devices always comprise a shaft to which mechanical energy is supplied. This shaft has to be led-through the crank-case, which involves the risk of leakage at this area. The device according to the invention is of the self-driving type, so that mechanical energy need not be supplied and lead-through devices for the shaft are dispensed with.

The invention will now be explained more fully by reference to the accompanying drawings, showing diagrammatically by way of example, some embodiments of self-driving devices according thereto.

Figs. 1, 1a, 2, 2a, 3, 3a, 4, 5 and 5a show very diagrammatically several embodiments of the devices according to the invention.

Figures 3, 3A:
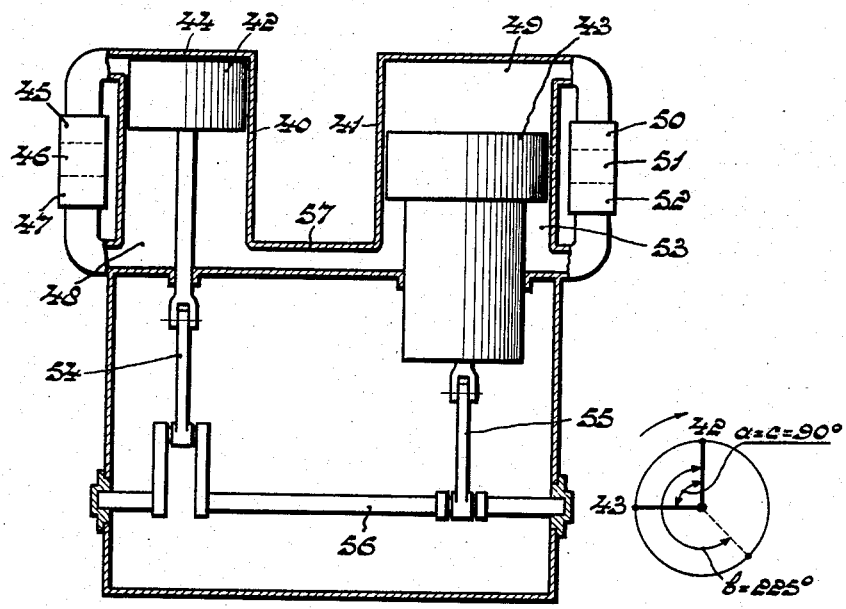

The device shown in Fig. 1 comprises a hot space 1, a cooled space 2 and a freezing space 3. The space 1 communicates by means of a heater 4, a regenerator 5 and a cooler 6 with the space 2, the freezing space 3 communicating by way of a heater 7, a regenerator 8 and a cooler 9 with the cooled space. The volume of each of the spaces 1, 2 and 3 is varied by piston-like bodies 10, 11, 12 respectively, which are connected by connecting rods 13, 14, 15 respectively with a common crank-shaft 16.

Fig. 1a shows the various positions of the crank.

Assuming that the variations in volume of the hot space lead by an amount $a=60°$ with respect to those of the freezing space, by an amount $b=120°$ with respect to those of the cooled space and by an amount $c=60°$ with respect to those of the total working space, and that the factor $v=1$ and the factor $k$ also $=1$, while $t_v=1.6$ and $t_w=0.5$, the value of tan $\delta$ may be calculated:

$$\tan d = \frac{1.6 \times 0.866}{1.6 \times 0.5 - 0.5 + 0.5} = \frac{0.866}{0.8} = \frac{2.25}{0.8} = 2.82$$

that is to say that $d=70\frac{1}{2}°$.

It appears that $a$ and $c$ are comprised between $d-180°$ and $d$, while both sin $d$ and the numerator of the above-mentioned fraction are positive, that is to say that the conditions are fulfilled by which the device of Fig. 1 may be constructed to be self-driving and capable of transporting heat from a lower temperature level to a higher. If the temperature of the hot space is 900° K., the temperature of the cooled space in this embodiment is $900 \times 0.5 = 450°$ K. and the temperature of the freezing space is $$\frac{450}{1.6} = 280° \text{ K.}$$

The installation is thus suitable as an air-conditioning installation or as a heat pump.

Fig. 2 shows a further embodiment of the device according to the invention. This device comprises three cylinders 20, 21, 22 in which piston-like bodies 23, 24, 25 are adapted to move up and down. The piston-like bodies 23 and 24 are constructed as displacers. The piston-like bodies are connected with the use of driving rods to a common crank-shaft 37. A space 26 above the piston-like body 23 communicates by way of a heater 27, a regenerator 28 and a cooler 29 with a cooled cold space 30. A space 31 above the piston-like body 25 is the cold space and communicates by way of a freezer 32, a regenerator 33 and a cooler 34 with a cooled space 35. The spaces 30, 35 communicate by way of channels 38 with a space 36 above the piston 24 and jointly constitute the total cooled space.

Fig. 2a shows the various positions of the crank associated with a calculational example.

For this machine also there may be given conditions at which it is self-driving. Assuming that $a=90°$, $b=185°$ and $c=120°$ and furthermore that $v=1$ and $k=1.5$, $t_v=1.3$ and $t_w=0.4$, then it is possible, as before to calculate tan $$\tan d = \frac{1.3 - 0.134}{0 - 1.5 + 0.4} = \frac{1.66}{-1.1} = -1.06$$

From this it follows that $d=133.3°$. Both $a$ and $c$ are smaller than $d$, sin $d$ and the numerator of the above-mentioned fraction being positive. Consequently, under the above-mentioned conditions, the device may be self-driving and capable of transporting heat from a lower temperature level to a higher. If, in this embodiment, the temperature of the hot-space is 900° K., the temperature of the cooled space is $$900 \times 0.4 = 360° \text{ K.}$$

The temperature of the freezing space is thus $$\frac{360}{1.3} = 277° \text{K.}$$

Consequently, the installation may successfully be used as a heat pump.

The device shown in Fig. 3 comprises only two cylinders 40 and 41. A displacer 42 and a differential piston 43 are adapted to reciprocate in the cylinders 40 and 41 respectively. The two piston-like bodies are coupled by way of driving-rod mechanisms 54 and 55 to a common crank-shaft 56. A space 44 above the piston 42 is the hot space of the engine, which communicates by way of a heater 45, a regenerator 46 and a cooler 47 with a cooled space 48 under the piston. A space 49 above the piston 43 communicates by way of a freezer 50, a regenerator 51 and a cooler 52 with a space 53 under the differential piston. The spaces 48 and 53 and a connecting channel 57 jointly constitute the total cooled space.

Fig. 3a shows the various positions of the crank associated with a calculational example.

If in the machine described above, the factor $v=2$, the factor $k=1.4$ and $a=c=90°$ and $b=225°$, the temperatures being so chosen that $t_v=1.3$ and $t_w=0.4$, then it is possible, as before, to calculate tan $\delta$. Tan $\delta$ is in this case equal to $$\frac{2\times 1.3-1}{0-1+0.4}=\frac{1.6}{-0.6}=-2.7$$

from which it follows that $d=110°$.

In this case also $a$ and $c$ are comprised between $d-180°$ and $d$, while both sin $d$ and the numerator of the fraction are positive. If, in this example, the temperature of the hot space is 800° K., the temperature of the cooled space is $800\times 0.4=320°$ K. and the temperature of the freezing space is $$\frac{320}{1.30}=246° K.$$

Figure 4:
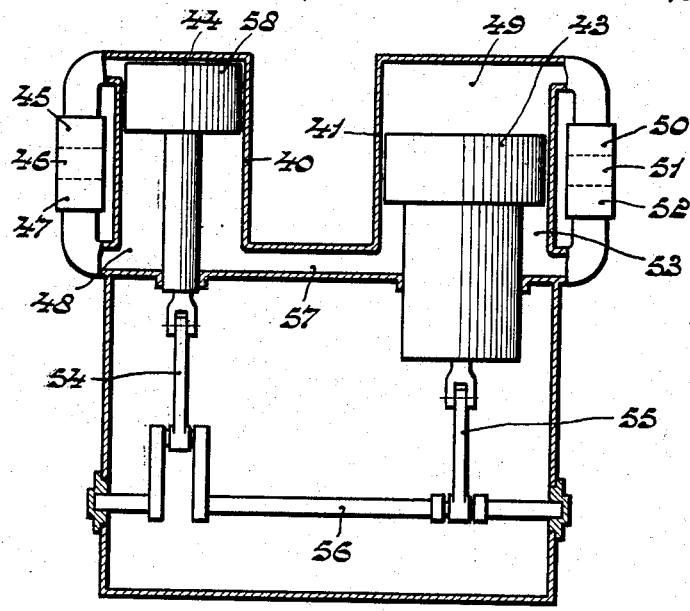

The device shown in Fig. 4 largely corresponds to the device shown in Fig. 3, so that here the same reference numerals are used as in Fig. 3. However, the device comprises a second differential piston 58 instead of the displacer 42.

Figure 5:
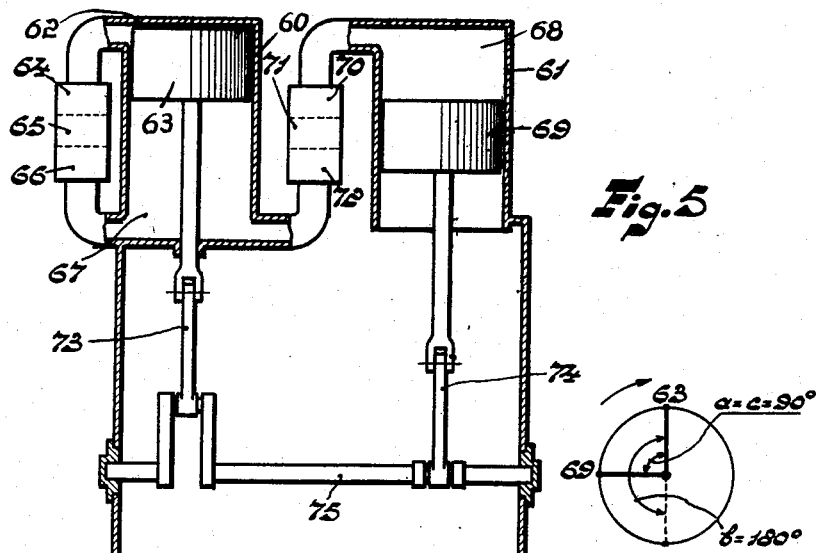

Fig. 5 shows a further embodiment of the device according to the invention. This device also comprises only two cylinders 60 and 61. A hot space 62 above a piston 63 in cylinder 60 communicates by way of a heater 64, a regenerator 65 and a cooler 66 with a space 67 under the piston 63. A space 68 above a piston 69 also communicates by way of a freezer 70, a regenerator 71 and a cooler 72 with the space 67. The space 68 is the freezing space and the space 67 is the cooled space of the device. The piston-like bodies 63 and 69 are coupled with the use of driving-rod mechanisms 73, 74 respectively to a crank-shaft 75.

Fig. 5a shows the positions of the crank-shaft associated with a calculational example.

The following factors may be assumed for the device shown in Fig. 5: $a=c=90°$, $b=180°$, $v=1$, $k=1$, $t_v=2$ and $t_w=0.4$.

$$\tan d=\frac{2}{0-1+0.4}=\frac{2}{-0.6}=-3.3$$

From this it follows that $d=106°$. In this embodiment also all requirements are satisfied, since $a$ and $c$ are comprised between $d=180°$ and $d$, while both sin $d$ and the numerator of the fraction are positive. If in this embodiment the temperature of the hot space is assumed to be 800° K., the temperature of the cooled space is $800\times 0.4=320°$ K. and the temperature of the freezing space is $$\frac{320}{2}=160° K.$$

Figure 6:
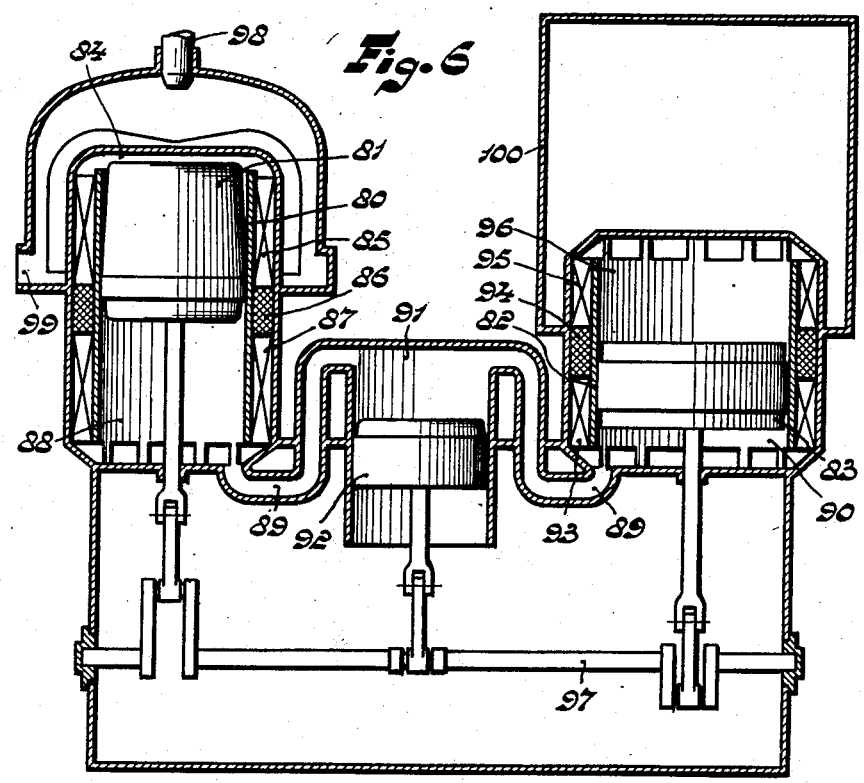
Figs. 6, 7 and 8 show more structural embodiments.

The device shown in Fig. 6 is identical with the device shown in Fig. 2. A displacer 81 and a displacer 83 are adapted to reciprocate in cylinders 80 and 82 respectively. A space 84 above the displacer 81 communicates by way of a heater 85, a regenerator 86 and a cooler 87 with a space 88, which communicates by way of channels 89 and a space 91 with a space 90. Said spaces constitute the cooled space, the volume of which is acted upon by a piston 92. The cooled space communicates by way of a cooler 93, a regenerator 94 and a freezer 95 with a freezing space 96. The displacers 81 and 83 and the piston 92 are coupled by way of driving rods to a crank-shaft 97, the cranks making a suitable angle with one another. The space 84 is maintained at a high temperature and is the hot space of the device. Thermal energy is supplied to this hot space with the use of a burner 98. The combustion gases supplied by this burner flow along the fins on the wall of the heater 85, leaving the combustion space through an outlet pipe 99. The freezing space 96 and the freezer 95 are arranged in a closed space 100, which requires to be maintained at a low temperature. The size and the stroke of piston 92 are so chosen that the piston supplies a sufficient amount of positive energy to the crank-shaft to reciprocate the displacers and the piston in the device. The mechanical energy transmitted with the use of this piston may, for example, also be used to drive the fuel pump for the burner 98, or to drive an air-compressor and a compressor capable of supplying regulating gas for varying the power of the device.

The piston 92 in this case acts upon the cooled space. However, it is also possible and in certain cases even desirable that this piston acts upon the hot space or the freezing space. In this figure the crank-case is constructed as a closed system without lead-through devices for the shaft. It will thus be possible to minimize and even to suppress completely a leak of working medium. Furthermore, the crank-case may be given a desired pressure so as to enable the forces in the driving rods to be reduced.

Figure 7:
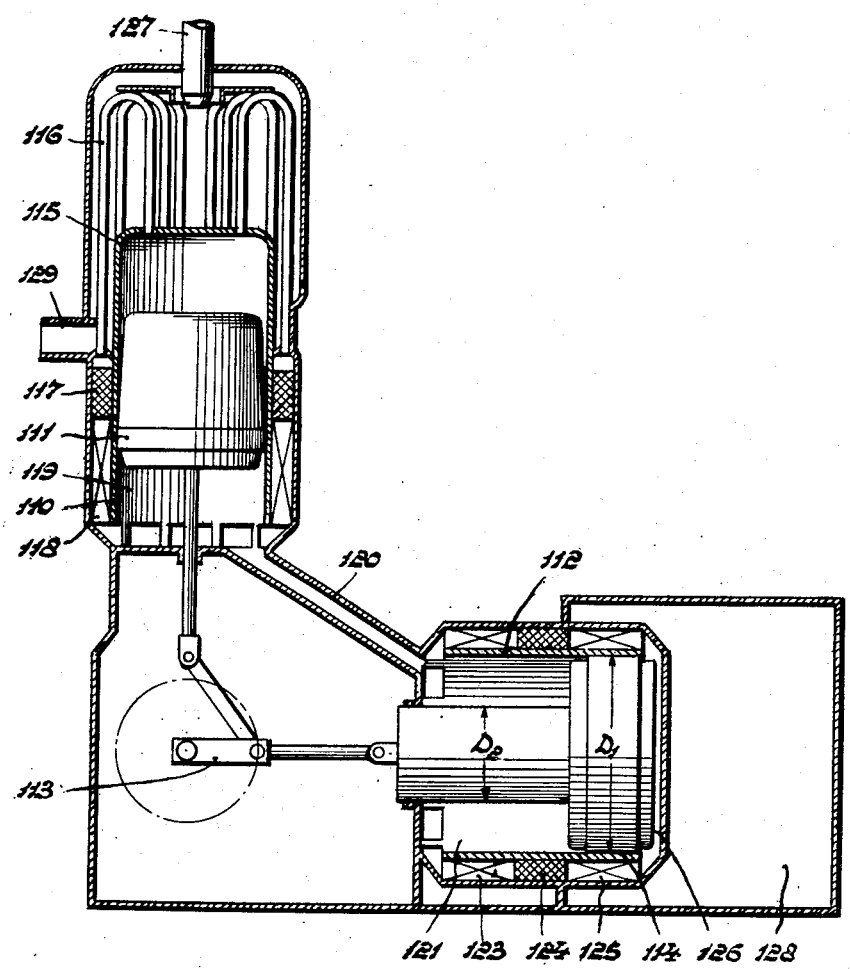

Fig. 7 shows a device which substantially corresponds to the device shown in Fig. 3. A displacer 111 is adapted to reciprocate in a cylinder 110 and is coupled by way of a driving-rod mechanism to a crank 113. The same crank has also secured to it the driving-rod mechanism for a differential piston 114, which is adapted to reciprocate in a cylinder 112. The center lines of the two cylinders make an angle of 90°. The differential piston 114 comprises a portion having a diameter $D_1$ and a portion having a diameter $D_2$. $D_2$ being considerably smaller than $D_1$, but on the other hand considerably larger than the diameter of the piston rod. The portion of the differential piston having the diameter $D_2$ corresponds to the piston 92 of Fig. 6 except that this piston is rigidly connected to the displacer 83 shown in Fig. 6. The portion $D_1$ corresponds to the displacer 83. In this case the factor $a$ is thus equal to the factor $c$. A space 115 above the displacer 111 is the hot space of the device and this space, in turn, communicates by way of a heater 116, which is in the form of a pipe heater, a regenerator 117 and a cooler 118 with a space 119. The latter communicates by way of a duct 120 with a space 121 under the differential piston 114 in the cylinder 112. The spaces 119 and 121 and the conduit 120 constitute the cooled space, which communicates by way of a cooler 123, a regenerator 124 and a freezer 125 with a freezing space 126.

Thermal energy is supplied to the hot space with the use of a burner 127, the combustion gases leaving the heater at 129, while the freezer and the freezing space are provided within a space 128 to be cooled. The operation of the refrigerating device corresponds to the operation of the refrigerating device shown in Fig. 6. If the conditions given in the above-mentioned formula are fulfilled, the differential piston will supply mechanical energy. The amount of energy supplied is dependent upon the diameter $D_2$ and the stroke of the differential piston.

Figure 8:
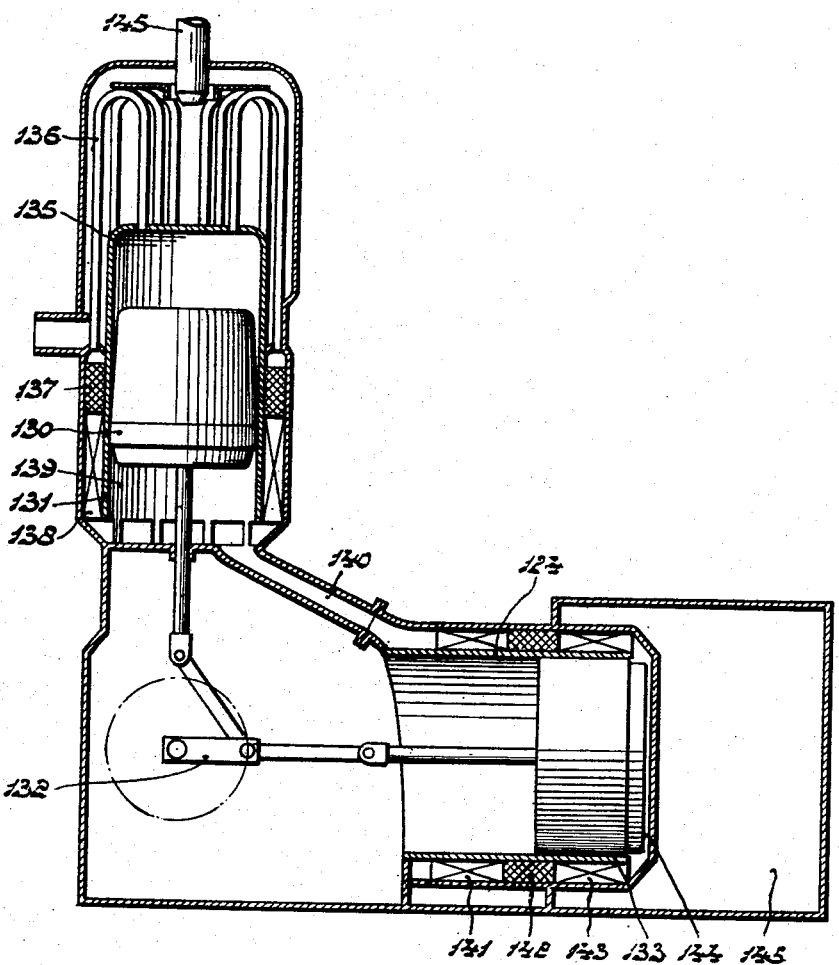

Fig. 8 shows a further embodiment of the device. This embodiment is largely identical with the embodiment shown in Fig. 5. The device shown in Fig. 8 comprises a piston, instead of the differential piston 114 of Fig. 7, the cooled space communicating directly with the space above this piston. A displacer 130 moves up and down in a cylinder 131 and is coupled by way of a driving-rod mechanism to a crank 132. This crank has also connected to it the driving-rod mechanism for a piston 133, which is adapted to reciprocate in a cylinder 134. The center lines of the cylinders 131 and 134 make an angle of 90°. A hot space 135 above the displacer 130 communicates by way of a heater 136, a regenerator 137 and a cooler 138 with a space 139 under the displacer 130. The space 139 and a channel 140 constitute the cooled space, which communicates by way of a cooler 141, a regenerator 142 and a freezer 143 with a freezing space 144. The hot space is maintained at high temperature with the use of a burner 145. The freezing space and the freezer are provided within a space 146, which requires to be maintained at low temperature.

Figure 9:
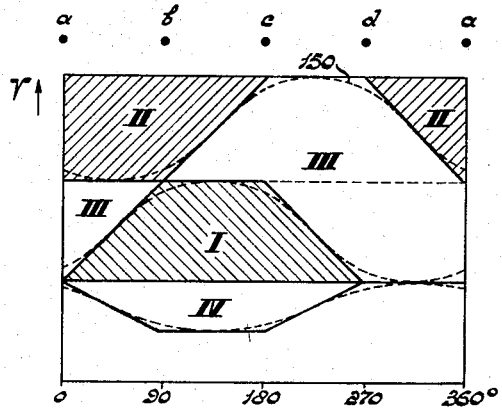

Fig. 9 shows a diagram giving the various positions of the piston of the engine shown in Figs. 2 and 6. The crank angle in degrees is plotted on the abscissa, the deviation $a$ of the piston-like bodies being plotted on the ordinate. The movements of the piston-like bodies in the device are harmonic, but for the sake of simplicity the harmonic movement indicated, for example, by the sinusoidal dashed line 150 is diagrammatically shown and replaced by broken lines having points $a, b, c, d$.

Figure 10:
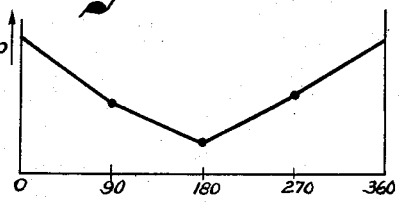
Figs. 9, 10, 11, 12, 13 and 14 show several diagrams of the thermodynamic cycles such as performed in the device shown in Fig. 6.

In Fig. 10, the pressure variation $p$ in the working space of the device is plotted with respect to the crank angle. The pressure and the crank angle are plotted on the ordinate and the abscissa respectively. The pressure variation in Fig. 10 is also simplified and replaced by straight lines. The pressure is maximum at a crank angle of $0°=360°$. Furthermore, in these diagrams, the clearance spaces are reduced to zero.

The surface I of Fig. 9 indicates the successive variations in volume of the freezing space, the surfaces II those of the hot space and the surfaces III and IV those of the cooled space, the surface IV only indicating the variations in volume of the additional piston which brings about the variations in volume of the total working space.

Figure 11:
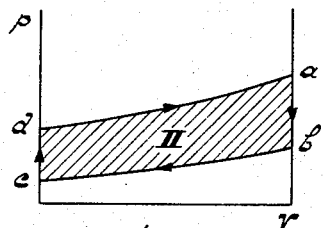

Fig. 11 shows diagrammatically the $pv$-diagram of the hot space. In this diagram the volume $v$ and the pressure $p$ are plotted on the abscissa and the ordinate respectively. The corresponding points indicated by $a, b, c, d$ of the diagram of Fig. 9 are also indicated in this diagram.

Figure 12:
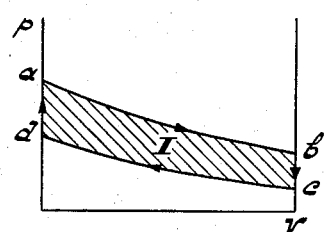

Fig. 12 shows in a similar manner the $pv$-diagram of the freezing space, points bearing the letters $a, b, c, d$ corresponding as before, to points bearing the letters of the preceeding figures.

Figure 13:
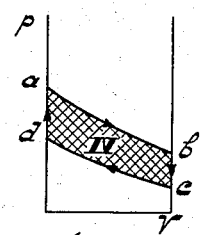

Fig. 13 shows the diagram for the piston which acts upon the total working space. The surface of this diagram is half the surface of the diagrams 11, 12. The figure shows that the piston-like body supplied positive energy so that this energy may be used to drive the piston-like bodies in the device.

Figure 14:
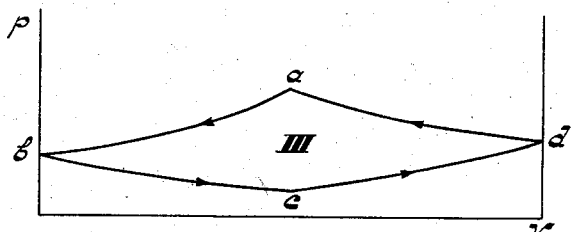

Fig. 14 shows the diagram of the portion III of the cooled space. The surface of this diagram is twice that of the diagrams of Figures 11 and 12, as also appears from Fig. 9.

Fig. 13 shows that the amount of energy which can be supplied by the piston-like bodies acting upon the total working space may be increased inter alia by increasing the volume of the stroke of this piston. An increase of the volume of the stroke results in an increased surface of the diagram and an increased amount of positive energy supplied by the piston.

As a rule, there will be only one piston which acts upon the variations in volume of the total working space. However, it is also possible that this action takes place by a plurality of pistons instead of one piston.

What I claim is:

1. A self-driving machine for transporting heat from a lower temperature level to a higher level, comprising a closed system containing gas of invariable chemical composition as the working medium and having first means enclosing a hot space, second means enclosing a freezing space, third means enclosing a cooled space, fourth means connecting said hot space to said cooled space, fifth means connecting said freezing space to said cooled space, said fourth and said fifth means each having a heater, a regenerator and a cooler therein, a plurality of reciprocating piston-like members varying the volumes of said spaces together with the total volume of the system, rod and shaft means for interconnecting said piston members and for reciprocating said piston members substantially harmonically with a constant phase difference, the variations in volume of the hot space differing in phase in the amount $b$ from those of the cooled space and by an amount $c$ from those of the total space $a$, $b$ and $c$ being assumed as positive if the hot space leads with respect to the spaces concerned, while both $a$ and $c$ are comprised between $d-180°$ and $d$, and $$\tan d = \frac{vt_v \sin a + k \sin b}{vt_v \cos a + k \cos b + t_w}$$

in which both $\sin d$ and the numerator of the fraction are positive.

2. A self-driving machine for transporting heat from a lower temperature level to a higher level, comprising a closed system containing gas of invariable chemical composition as the working medium and having first means enclosing a hot space, second means enclosing a freezing space, third means enclosing a cooled space, fourth means connecting said hot space to said cooled space, fifth means connecting said freezing space to said cooled space, said fourth and said fifth means each having a heater, a regenerator and a cooler therein, a plurality of reciprocating piston-like members varying the volumes of said spaces together with the total volume of the system, the end surfaces of one of said piston-like members acting on the volumes of two of said spaces of sequential temperature level, rod and shaft means for interconnecting said piston members and for reciprocating them substantially harmonically with a constant phase difference, the variations in volume of the hot space differing in phase in the amount $b$ from those of the cooled space and by an amount $c$ from those of the total space, $a$, $b$, and $c$ being assumed as positive if the hot space leads with respect to the spaces concerned, while both $a$ and $c$ are comprised between $d-180°$ and $d$, and $$\tan d = \frac{vt_v \sin a + k \sin b}{vt_v \cos a + k \cos b + t_w}$$

in which both sin $d$ and the numerator of the fraction are positive.

3. A self-driving machine for transporting heat from a lower temperature level to a higher level, comprising a closed system containing gas of invariable chemical composition as the working medium and having first means enclosing a hot space, second means enclosing a freezing space, third means enclosing a cooled space, fourth means connecting said hot space to said cooled space, fifth means connecting said freezing space to said cooled space, said fourth and said fifth means each having a heater, a regenerator and a cooler therein, a plurality of reciprocating piston-like members varying the volumes of said spaces together with the total volume of the system, the end surfaces of one of said piston-like members acting on the volumes of said hot and cooled spaces, rod and shaft means for interconnecting said piston members and for reciprocating them substantially harmonically with a constant phase difference, the variations in volume of the hot space differing in phase in the amount $b$ from those of the cooled space and by an amount $c$ from those of the total space $a$, $b$ and $c$ being assumed as positive if the hot space leads with respect to the spaces concerned, while both $a$ and $c$ are comprised between $d-180°$ and $d$, and $$\tan d = \frac{vt_v \sin a + k \sin b}{vt_v \cos a + k \cos b + t_w}$$

in which both sin $d$ and the numerator of the fraction are positive.

4. A self-driving machine for transporting heat from a lower temperature level to a higher level, comprising a closed system containing gas of invariable chemical composition as the working medium and having first means enclosing a hot space, second means enclosing a freezing space, third means enclosing a cooled space, fourth means connecting said hot space to said cooled space, fifth means connecting said freezing space to said cooled space, said fourth and said fifth means each having a heater, a regenerator and a cooler therein, a plurality of reciprocating piston-like members varying the volumes of said spaces together with the total volume of the system, the end surfaces of one of said piston-like members acting on the volumes of said hot and cooled spaces, the end surfaces of a second piston-like member acting on both the volume of said freezing space and said cooled space, only one end surface of said second piston-like member acting upon the volume of one of said latter two spaces, rod and shaft means for interconnecting said piston members and for reciprocating them substantially harmonically with a constant phase difference, the variations in volume of the hot space differing in phase in the amount $b$ from those of the cooled space and by an amount $c$ from those of the total space, $a$, $b$ and $c$ being assumed as positive if the hot space leads with respect to the spaces concerned, while both $a$ and $c$ are comprised between $d-180°$ and $d$, and $$\tan d = \frac{vt_v \sin a + k \sin b}{vt_v \cos a + k \cos b + t_w}$$

in which both sin $d$ and the numerator of the fraction are positive.

5. A self-driving machine for transporting heat from a lower temperature level to a higher level, comprising a closed system containing gas of invariable chemical composition as the working medium and having first means enclosing a hot space, second means enclosing a freezing space, third means enclosing a cooled space, fourth means connecting said hot space to said cooled space, fifth means connecting said freezing space to said cooled space, said fourth and said fifth means each having a heater, a regenerator and a cooler therein, three reciprocating piston-like members varying the volumes of said spaces together with the total volume of the system, the end surfaces of a first piston-like member acting on the volumes of said hot and cooled spaces, the end surfaces of a second piston-like member acting on both the volume of said freezing space and said cooled space, only one end surface of said second piston-like member acting upon the volume of one of said latter two spaces and a third piston-like body moving in phase with said second piston-like member, rod and shaft means for interconnecting said piston members and for reciprocating said first and second piston-like members substantially harmonically with a constant phase difference, the variations in volume of the hot space differing in phase in the amount $b$ from those of the cooled space and by an amount $c$ from those of the total space $a$, $b$ and $c$ being assumed as positive if the hot space leads with respect to the spaces concerned, while both $a$ and $c$ are comprised between $d-180°$ and $d$, and $$\tan d = \frac{vt_v \sin a + k \sin b}{vt_v \cos a + k \cos b + t_w}$$

in which both sin $d$ and the numerator of the fraction are positive.

6. A self-driving machine for transporting heat from a lower temperature level to a higher level, comprising a closed system containing gas of invariable chemical composition as the working medium and having first means enclosing a hot space, second means enclosing a freezing space, third means enclosing a cooled space, fourth means connecting said hot space to said cooled space, fifth means connecting said freezing space to said cooled space, said fourth and said fifth means each having a heater, a regenerator and a cooler therein, two reciprocating piston-like members varying the volumes of said spaces together with the total volume of the system, one of said piston-like members being a differential-type piston and has its end surfaces acting on the volumes of said hot and cooled spaces, rod and shaft means for interconnecting said piston members and for reciprocating them substantially harmonically with a constant phase difference, the variations in volume of the hot space differing in phase in the amount $b$ from those of the cooled space and by an amount $c$ from those of the total space $a$, $b$ and $c$ being assumed as positive if the hot space leads with respect to the spaces concerned, while both $a$ and $c$ are comprised between $d-180°$ and $d$, and $$\tan d = \frac{vt_v \sin a + k \sin b}{vt_v \cos a + k \cos b + t_w}$$

in which both sin $d$ and the numerator of the fraction are positive.

7. A self-driving machine for transporting heat from a lower temperature level to a higher level, comprising a closed system containing gas of invariable chemical composition as the working medium and having first means enclosing a hot space, second means enclosing a freezing space, third means enclosing a cooled space, fourth means connecting said hot space to said cooled space, fifth means connecting said freezing space to said cooled space, said fourth and said fifth means each having a heater, a regenerator and a cooler therein, two reciprocating piston-like members varying the volumes of said spaces together with the total volume of the system, both of said piston-like members being differential-type pistons, one of said pistons having its end surfaces acting on the volumes of said hot and cooled spaces, rod and shaft means for interconnecting said piston members and for reciprocating them substantially harmonically with a constant phase difference, the variations in volume of the hot space differing in phase in the amount $b$ from those of the cooled space and by an amount $c$ from those of the total space $a$, $b$ and $c$ being assumed as positive if the hot space leads with respect to the spaces concerned, while both $a$ and $c$ are comprised between $d-180°$ and $d$, and $$\tan d = \frac{vt_v \sin a + k \sin b}{vt_v \cos a + k \cos b + t_w}$$

in which both $\sin d$ and the numerator of the fraction are positive.

8. A self-driving machine for transporting heat from a lower temperature level to a higher level, comprising a closed system containing gas of invariable chemical composition as the working medium and having first means enclosing a hot space, second means enclosing a freezing space, third means enclosing a cooled space, fourth means connecting said hot space to said cooled space, fifth means connecting said freezing space to said cooled space, said fourth and said fifth means each having a heater, a regenerator and a cooler therein, two reciprocating piston-like members varying the volumes of said spaces together with the total volume of the system, the end surfaces of one of said piston-like members acting on the volumes of said hot and cooled spaces, the other piston-like member having only one operating surface which acts on the volume of said freezing space, rod and shaft means for interconnecting said piston members and for reciprocating them substantially harmonically with a constant phase difference, the variations in volume of the hot space differing in phase in the amount $b$ from those of the cooled space and by an amount $c$ from those of the total space $a$, $b$ and $c$ being assumed as positive if the hot space leads with respect to the spaces concerned, while both $a$ and $c$ are comprised between $d-180°$ and $d$, and $$\tan d = \frac{vt_v \sin a + k \sin b}{vt_v \cos a + k \cos b + t_w}$$

in which both $\sin d$ and the numerator of the fraction are positive.

9. A self-driving machine for transporting heat from a lower temperature level to a higher level, comprising a closed system containing gas of invariable chemical composition as the working medium and having first means enclosing a hot space, second means enclosing a freezing space, third means enclosing a cooled space, fourth means connecting said hot space to said cooled space, fifth means connecting said freezing space to said cooled space, said fourth and said fifth means each having a heater, a regenerator and a cooler therein, two reciprocating piston-like members varying the volumes of said spaces together with the total volume of the system, the center lines of each of said piston-like members being at an angle of 90° to each other, rod and shaft means for interconnecting said piston members and for reciprocating them substantially harmonically with a constant phase difference, said cooled space being located adjacent said shaft means, the variations in volume of the hot space differing in phase in the amount $b$ from those of the cooled space and by an amount $c$ from those of the total space, $a$, $b$ and $c$ being assumed as positive if the hot space leads with respect to the spaces concerned, while both $a$ and $c$ are comprised between $d-180°$ and $d$, and $$\tan d = \frac{vt_v \sin a + k \sin b}{vt_v \cos a + k \cos b + t_w}$$

in which both $\sin d$ and the numerator of the fraction are positive.

10. A self-driving machine for transporting heat from a lower temperature level to a higher level, comprising a closed system containing gas of invariable chemical composition as the working medium and having first means enclosing a hot space, second means enclosing a freezing space, third means enclosing a cooled space, fourth means connecting said hot space to said cooled space, fifth means connecting said freezing space to said cooled space, said fourth and said fifth means each having a heater, a regenerator and a cooler therein, a plurality of reciprocating piston members varying the volumes of said spaces together with the total volume of the system, rod and shaft means completely enclosed in a crank-case for interconnecting said piston members and for reciprocating them substantially harmonically with a constant phase difference, the variations in volume of the hot space differing in phase in the amount $b$ from those of the cooled space and by an amount $c$ from those of the total space, $a$, $b$ and $c$ being assumed as positive if the hot space leads with respect to the spaces concerned, while both $a$ and $c$ are comprised between $d-180°$ and $d$, and $$\tan d = \frac{vt_v \sin a + k \sin b}{vt_v \cos a + k \cos b + t_w}$$

in which both $\sin d$ and the numerator of the fraction are positive.

CORNELIUS OTTO JONKERS.

References Cited in the file of this patent

UNITED STATES PATENTS

| Number | Name | Date |
|---|---|---|
| 2,468,293 | DuPre | Apr. 26, 1949 |
| 2,484,392 | Van Heeckeren | Oct. 11, 1949 |
| 2,558,481 | Dros | June 26, 1951 |